Feb. 19, 1963   W. M. JEFFERS   3,078,442
TRAFFIC CONTROL SYSTEM
Filed March 28, 1960
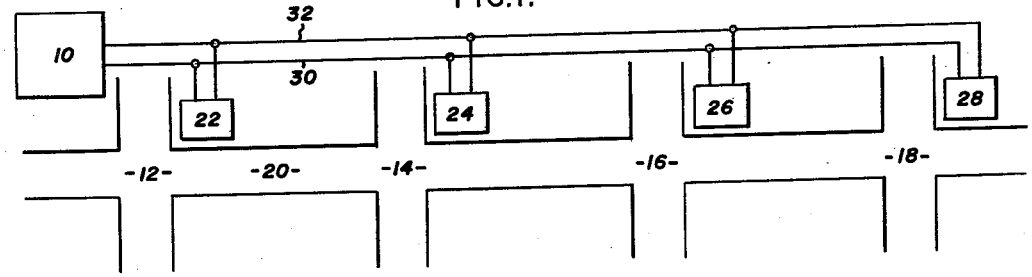
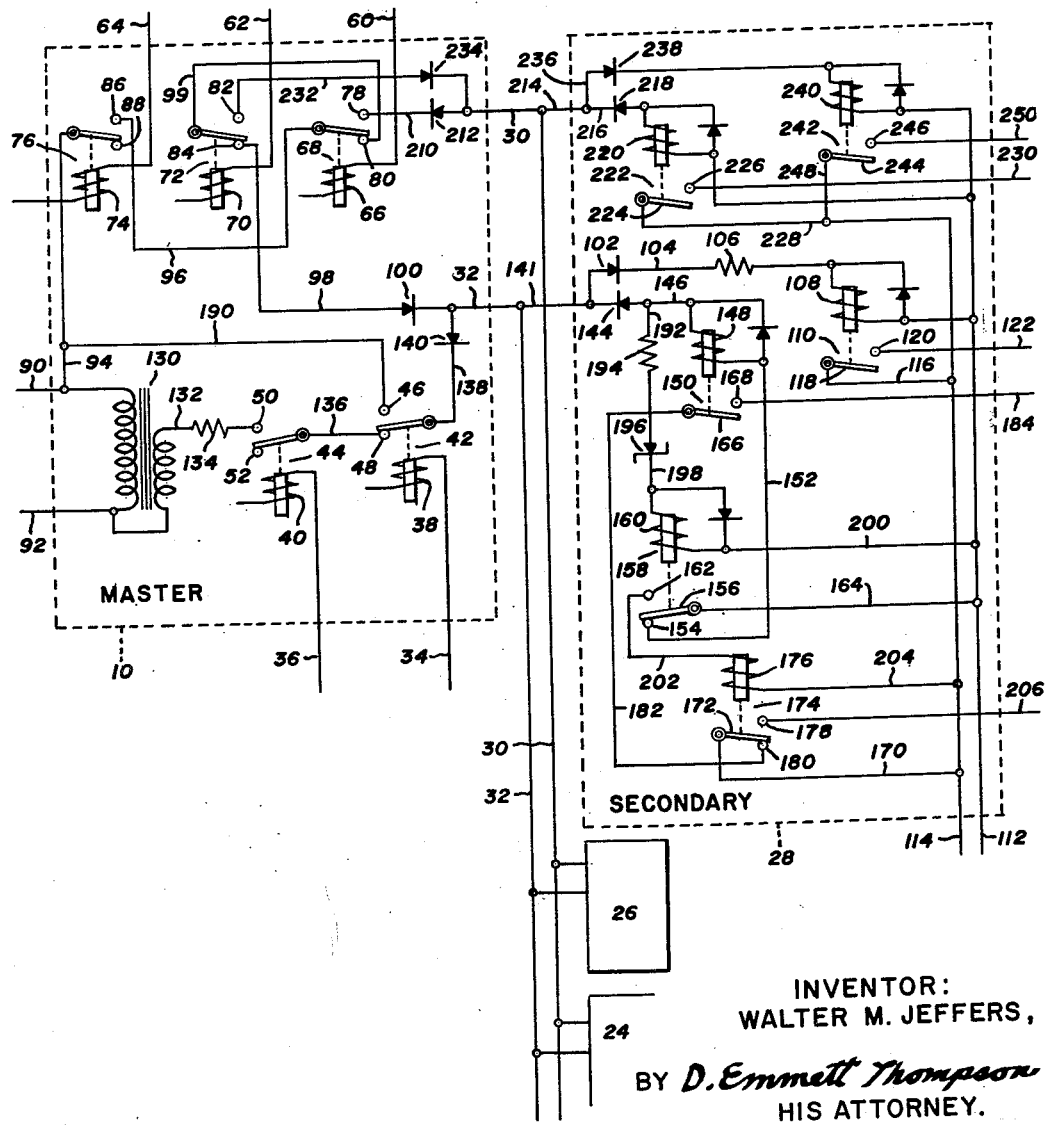
INVENTOR:
WALTER M. JEFFERS,
BY D. Emmett Thompson
HIS ATTORNEY.

United States Patent Office

3,078,442
Patented Feb. 19, 1963

---

3,078,442
TRAFFIC CONTROL SYSTEM
Walter M. Jeffers, Syracuse, N.Y., assignor to Crouse-Hinds Company, Syracuse, N.Y., a corporation of New York
Filed Mar. 28, 1960, Ser. No. 18,027
3 Claims. (Cl. 340—40)

This inventon relates to and has as an object a new and improved traffic control system of the interconnected type.

Certain of such interconnected traffic control systems utilize a master supervisory controller and a plurality of secondary controllers located at the intersections along the street or path of movement of the vehicular traffic. Each of the secondary controllers is normally connected to the master controller which is remotely located from the secondary controllers so as to permit changes to be effected at the secondary controllers by various operations at the master controller.

Certain secondary controllers of such interconnected traffic control systems utilize three timer dials, each giving different periods of time for the right-of-way to the main and cross-streets of the intersection at which the secondary controller is located. The means for energizing one of said dials and de-energizing the other of said dials is located within the secondary controller and is actuated from the master controller. In addition, the system may be arranged so as to permit what is known in the art as a progressive movement of the traffic along the highway or path of vehicular movement controlled by the complete system. Such a progression is effected by maintaining a predetermined "offset" or out-of-phase relation between each of the timer dials in the secondary controllers and a master supervisory timer dial in the master controller. In traffic control systems heretofore the control means for maintaining one of a plurality of such offsets is contained within each of the secondary controllers and the selection of the particular control means is actuated from the master controller.

Systems have heretofore been disclosed in which the selection of the traffic control functions at the master controller are effected at the secondary controllers by means of audio tones, pulsing devices, or the like. One problem in connection with such systems is the fact that in order to effect the various traffic control functions at the secondary controllers from the master controller it was necessary to provide a single wire for each of such functions interconnected from the master controller to each of the secondary controllers, thereby necessitating the installation of a large wiring cable in conjunction with the installation of such systems.

The invention hereinafter disclosed is much simpler and more reliable by the selection of component parts having long useful life. The arrangement is such to insure proper response at the secondary controller when a specific traffic control function is selected at the master controller. Power failure anywhere at any time in the system will not cause improper response when power is restored. This is true when even if the power is off when a change is selected at the master controller. Further, the system comprising this invention eliminates the need for amplifiers and the like at the secondary controllers.

Accordingly, it is an object of this invention to provide a traffic control system comprising a master controller and a plurality of secondary intersection controllers, each of the secondary controllers having a plurality of traffic control functions which are actuated from the master controller, wherein the master controller is interconnected with each of the secondary controllers by not more than two wires.

It is a further object of this invention to provide a traffic control system wherein the master controller may be connected to the secondary controllers to permit the actuation of a plurality of traffic controlled functions by a single wire.

The invention consists in the novel features and in the combinations and constructions hereinafter set forth and claimed.

In describing this invention, reference is had to the accompanying drawings in which like characters designate corresponding parts in all the views.

In the drawings:

FIGURE 1 is a schematic illustration of a traffic control system embodying this invention.

FIGURE 2 is a circuit diagram of a portion of the master controller shown to the left of the figure which is interconnected with one of the plurality of secondary controllers, a portion of the circuit diagram of which is shown to the right of the figure, the complete circuit diagram illustrating the preferred embodiment of the invention.

In FIGURE 1, the master controller indicated by the box 10 is remotely located from the intersections 12, 14, 16 and 18 of a plurality of cross streets with the main street or highway 20. A plurality of secondary controllers indicated by the boxes 22, 24, 26 and 28 are located at the intersections 12 to 18 inclusive for controlling the traffic movement at the intersections, and each of the secondary controllers is connected to the master controller by the wires 30 and 32. The illustration of FIGURE 1 is shown by way of example only and is not intended to be limiting in any manner since this invention can be utilized with any number of secondary conrtollers located in any pattern or arrangement of intersections.

In FIGURE 2, the master controller 10, generally indicated by the dash lines to the left of the figure, is shown as being connected by the wires 30 and 32 to one of the secondary controllers indicated by the dash lines 28 to the right of the figure.

In the master controller 10, the lines 34 and 36 are connected at one end to operative means (not shown) for effecting a transfer from dial one of the secondary controllers to either of dials two or three, as the case may be. This operative means may comprise a program device or the like. As seen in FIGURE 2, the lines 34 and 36 are connected to the coils 38 and 40, respectively, of relays 42 and 44. The opposite side of the coils 38 and 40 of the relays are connected to ground potential, whereby when the lines 34 and 36 are connected through the programming device, or the like, to a hot feed, the coils will be energized to actuate the relays 42 and 44. Relay 42 is provided with a set of contacts, 46 and 48, and relay 44 is also provided with a set of contacts, 50 and 52. Each of the contact sets 46 to 52 comprises a front and back fixed contact and a central movable contact, as is conventional.

Through the circuitry comprising the preferred embodiment of this invention energization of the relay 42 will effect transfer in each of the secondary controllers from timer dial one to timer dial three, or from dial two to dial three, while energization of the relay 44 will effect transfer from time dial one to timer dial two. When netiher of the relays 42 or 44 is actuated, timer dial one, through circuitry comprising no part of this invention, will be maintained in an operative state.

Shown in the upper left-hand corner of the master controller 10 in FIGURE 2 are three lines, 60, 62 and 64, which are connected to operative means (not shown) in the master controller for selecting one of three offsets for each of the timer dial units in the secondary controllers.

Line 60 is connected at one side to the coil 66 of relay 68 and at its opposite side to ground potential. Line 62 is connected at one side to the coil 70 of relay 72 and its opposite side to ground potential, and in like manner line 64 is connected to one side of the coil 74 of relay 76, and at the opposite side to a ground potential. Relays 68, 72 and 76 are each provided with a set of contacts 78, 80, 82, 84, 86 and 88, and each of these contact sets comprise front and back fixed contacts and a central movable contact.

Through circuitry comprising no part of this invention, each of the timer dials in the secondary controllers is provided with means for establishing and maintaining one of a plurality of predetermined offset relationships between each of the dials in the secondary controllers and a master supervisory dial in the master controller. As will be hereinafter described, any one of these offset relationships may be established on the dials of the secondary controllers by selection from the master controller and the thus selected offset relationship will also be automatically maintained from the master controller.

Each of the wires 60 and 62 is connected to a program device, for example, for switching from offsets two or three. As will be understood the wires 60 and 62 may also be connected through selectively operated switches so as to permit the energization of the coils of relay 68 and 72 to permit the transfer from offset one to either of offsets two or three.

Wire 64 is connected through a pair of contacts which close once each time cycle by a master supervisory control dial in order to maintain the desired offset relation between the dials of the secondary controllers and the master supervisory dial. When the master supervisory dial (not shown) closes its contact a hot feed is connected to the line 64 thereby completing a circuit through coil 74 of the relay 76 to the ground potential thus energizing relay 76. Through appropriate circuitry (not shown) in the secondary controllers, the closing of the supervisory contacts in the master controls automatically checks and maintins the offset relation between the dials in the secondary controllers and the master dial so as to prevent the secondary dials from deviating from the preselected offset relation.

Accordingly, the middle contact of the contact set 86 and 88 of relay 76 is normally in the upper position when the power is on thereby completing a circuit from the hot side 90 of a 60 cycle, 120 volt A.C. power supply having a return or common line 92. This circuit comprises line 90, line 94, the middle contact of contact set 88 and 86 and the upper contact of relay 76, line 96 through the middle and lower contacts of contact set 78 and 80 of relay 68, line 99, through the middle and lower contacts of contact set 82 and 84 of relay 72, line 98 to rectifier 100, polarized positively similar to rectifier 102, line 104, current limiting resistor 106, coil 108 of relay 110, to a common return, line 112 in the secondary intersection controller, for example, secondary controller 28, as shown in FIGURE 2. This circuit energizes the coil 108 of relay 110, thus completing a first traffic control circuit from the hot side 114 of the power supply at the secondary controller through line 116, armature 118 of relay 110, first contact 120 and line 122 which is connected to the operative means (not shown), for checking the offset relation between the timer dial which is running in the secondary controller and the master supervisory dial. As previously described, the de-energizaton of the coil 74 of relay 76 once during each complete revolution of the master supervisory dial effects the de-energization of relay 76 thus breaking the circuit just described through the middle contact of contact set 86 and 88 of relay 76. This momentary breaking of the circuit serves to check and maintain the desired offset relationship and comprises no part of the invention.

The secondary controllers are so wired that in normal operation dial one is energized to establish the time cycle length and splits the right-of-way signal display between the main and cross streets at the intersection which the secondary controller regulates. When it is desired to switch from dial one at the secondary controller to dial two in each of the secondary controllers suitable operative means in the master controller, such as a selectively operative switch or programming device, is actuated to connect line 36 to a hot feed thereby completing a circuit through the coil 40 of relay 44 to ground potential. This circuit thus energizes the relay 44 and moves the middle contact of contact set 50 and 52 from the lower contact, as shown in FIGURE 2, to the upper contacts. This energization of relay 44 completes a circuit from the secondary of a transformer 130 having its primary connected across the power supply line 90 and 92. This circuit comprises line 132 connected to the secondary of transformer 130 which is selected so as to provide an output voltage on the line 132 of some value less than the line voltage. In the embodiment shown and described, the transformer 130 has been selected so as to provide a voltage from the secondary through line 132 of approximately 40 volts. The completed circuit comprises line 132, resistor 134 which serves to prevent a short circuit which would otherwise exist across the upper part of the transformer on positive voltage half cycles when both relays 44 and 76 are energized. Line 132 is connected to the upper contact of contact set 50 and 52 of relay 44 and through the middle contact which is now in the up position by virtue of the energization of relay 44 to line 136, which is connected to the lower contact of contact set 46 and 48 of relay 42, the middle contact of the contact set, line 138 through a negative biased rectifier 140, and line 32 to line 141 connected to a negatively biased rectifier 144 similar to rectifier 140, line 146 through the coil 148 of a relay 150 to line 152, which is connected to the contact 154 through armature 156 of a relay 158 having a coil 160 and front contact 162, to line 164 which is connected to the common return line 112 in the secondary controller. The circuit just described energizes the relay 150 thus moving the armature 166 into engagement with the contact 168 thereby completing a second traffic control circuit from the hot side 114 of the secondary power supply through line 170, armature 172 of a relay 174 having a coil 176, a front contact 178 and a back contact 180 to line 182, armature 166, front contact 168 and line 184 which is connected to the operative means (not shown), for effecting transfer in the secondary controllers from dial one to dial two.

Thus it will be seen that the operation of the first offset means connected to line 122, and the transfer from dial one to dial two, are both effected through the line 32 which connects the master controls to the secondary controllers. Similarly, the transfer from dial one to dial three is effected through the line 32 in a manner to be next described.

When a hot feed is placed on line 34, by either a selective or an automatically operated switch to energize the coil 38 of relay 42, the middle contact of the contact set 46 and 48 is moved from the position shown in FIGURE 2 to the upper position where it is in engagement with the upper contact.

This completes a circuit from line 90 which is connected to the hot side of the power supply at the master controller to line 94, line 190, the upper contact and middle contact of contact set 46 and 48, line 138, through negatively biased rectifier 140, line 32, line 141 through the negatively biased rectifier 144, line 146, line 192, resistor 194, through a Zener diode 196 to line 198, through the coil 160 of relay 158 to line 200 which is connected to the common return line 112 in the secondary controller.

The Zener diode 196 is selected so as to only pass negative full line voltage pulses through the diode, and the relay 158 is selected so as to be energized only by such full line negative voltage pulses.

The energization of the relay 158 completes a circuit consisting of line 164, which is connected to the common line 112, armature 156 of the relay 158 which is moved from the position shown in FIGURE 2 to the front contact 162, line 202 to the coil 176 of relay 174 which is connected by line 204 to the hot side 114 of the power supply thereby energizing the relay 174.

This energization of the relay 174 breaks the circuit described above for effecting transfer from dial one to dial two, through armature 172 of the relay 174 and completes a third traffic control circuit from the hot line 114 through line 170, armature 172 which is moved into engagement with the front contact 178 when the relay 174 is energized, to line 206 which is connected to the operative means (not shown) for effecting transfer from either dial one or dial two, as the case may be, to dial three.

The relay 110 is selected to operate on positive full line voltage pulses, while the relay 150 is selected to operate on negative voltage pulses having a value less than peak line potential, and in this case the relay has been selected to operate at negative voltage pulses of about 40 volts. The relay 158 is selected so as to operate in combination with the Zener diode 196 at full line negative voltage pulses of 120 volts. Consequently, it will be seen that the maintenance of the first or number one offset between the dials of the secondary controllers and the master supervisory dial, and the transfer from dial one to dial two or either of dials one or two to dial three are all effected over the single wire 32 which connects the master controller to the plurality of secondary controllers. This is a very advantageous feature and permits the installation of traffic control systems wherein as many as three traffic control functions may be rendered operative over a single wire connecting the master controller to a plurality of secondary controllers.

As will therefore be obvious, the transfer from dial one to dial two, or from either of dials one or two to dial three may be effected simultaneously over the wire 32 with the means for establishing and maintaining the first offset relationship between the then operating timer dial in the secondary controllers and the master controller. This is highly advantageous since the transfer between the dials may be effected at any time without the necessity for delay and without interferring with the maintenance of the first offset relationship. As will be obvious, this is accomplished by the utilization of oppositely polarized voltage pulses over the same line, that is, line 32 in the example shown and described.

It is oftentimes desirable to equip each of the timer dials in the secondary controllers with more than one offset in order to vary the offset between the dials in the secondary controller and the master supervisory dial in the master controller. This is so in order to permit a change in the progressive movement of the traffic through the traffic control system. For example, one progression may be desirable in the early morning hours to handle the incoming flow of traffic while a second progression may be desirable for the middle part of the day to handle the normal traffic flow and a third progression may be desirable in the late afternoon hours to handle the heavy outward flow of traffic. When the timer dials in the secondary controllers are equipped with a plurality of different offsets to permit the changing of the progression it is desirable to be able to select any of the plurality of the offsets on any of the dials in the secondary controllers from the master controller. Means for effecting such a change of offsets will next be described.

When it is desired to change the offset relationship of the secondary controller dials, with respect to the master supervisory dial in the master controller, from the first offset to the second offset, a hot feed is placed on the line 60 by either an automatic or selectively operated switch device. This hot feed completes a circuit through the coil 66 of relay 68 to a ground potential thereby energizing the relay 68. The energization of relay 68 causes the middle contact of the contact set 78 and 80 to move from the lower position shown in FIGURE 2, to the upper position where it engages the upper contact of the contact set 78 and 80. This completes a circuit from the hot side of the power supply 90 through the line 94, the middle and upper contacts of the contact set 86 and 88 of relay 76, line 96, middle and upper contacts of the contact set 78 and 80, line 210, negatively polarized rectifier 212, line 30, the second line interconnecting the master controller to the secondary controllers, line 214 to line 216 through negatively polarized rectifier 218, similar to the rectifier 212, and through the coil 220 of relay 222 having an armature 224 and contact 226. The opposite side of coil 220 is connected to the common return line 112 at the secondary controller thereby completing a circuit and energizing the relay 222. The relay 222 is selected so as to be operable only in response to full negative line voltage pulses and when the relay is energized a fourth traffic control circuit is completed from the hot side 114 of the power supply in the secondary controller through line 228, armature 224, contact 226 and line 230 which is connected to the means (not shown) for establishing the second offset between the then operating timer dial and the master supervisory dial.

When it is desired to render the third offset means on the then operating dial in each of the secondary controllers operative, and render the first and second offset means inoperative, a hot feed is placed on the line 62 by any suitable transfer means in the master controller. The hot feed completes a circuit from line 62 through the coil 70 of relay 72 to ground potential thereby energizing relay 72. When the relay 72 is energized a circuit is completed from the hot side 90 of the power supply at the master controller through line 94, middle and upper contacts of the contact set 86 and 88 of relay 76, line 96, middle and lower contacts of the contact set 78 and 80 of relay 68, line 99, middle contact of the contact set 82 and 84 of relay 72, and the upper contact of the same relay which is engaged by the middle contact when the relay 72 is energized, line 232 through the positively polarized rectifier 234, line 30, line 236 through the positively polarized rectifier 238 similar to the rectifier 234 to the coil 240 of relay 242 having an armature 244 and front contact 246. The opposite side of the coil 240 is connected to the common side 112 of the power supply and in the secondary controller thereby completing a circuit and energizing the relay 242. The energization of relay 242 completes a fifth traffic control circuit from the hot side 114 of the power supply through line 248, armature 244, contact 246 to line 250 which is connected to the means (not shown) for rendering operative the third offset on each of the operating dials in the secondary controllers. The relay 242 is selected so as to be energized only by positive full line voltage pulses.

Since power is supplied from the hot side 90 of the power supply at the master controller through the contact sets 88 and 86 of relay 76 to the line 30 through either of the relays 78 or 82, as the case may be, for establishing the second and third offset relationships between the timer dials and the secondary controller and the master controller, it will be obvious that, as described in connection with the description of the first offset, the second and third offsets will also be maintained and checked due to the fact that the master supervisory dial causes de-energization of the relay 76 once during each revolution, and, similarly to the first offset relationship, this momentary interruption of the power supply serves to check and maintain the second and third offsets over the line 30.

Consequently, it will be seen that the addition of a second wire 30 between the master controller and the secondary controllers two additional traffic control functions may be actuated from the master controller, these functions being in the example shown and described, the selection of the second and third offsets. As will be obvious, this is accomplished by utilizing oppositely polarized voltage pulses over the same wire.

As seen in connection with the description of FIGURE 2, since each of the secondary controllers is provided with a local power supply having a common return line 112, there is no necessity for providing a common return line interconnected between the master controller and each of the secondary controllers.

As shown in FIGURE 2, rectifiers have been connected in parallel across the coils of relay 158, 150, 110, 222 and 242. These rectifiers are conventional and are utilized to hold the current between the voltage pulses and prevent chatter in the relays.

As also shown in FIGURE 2, relays 42, 44, 68, 72 and 76 may be load type relays for increased long life. It is to be understood, however, that any suitable relay may be used without departing from the scope of the invention. Also in this connection, relays 110, 150, 158, 174, 222 and 240 are illustrated as being low current type operating relays and, as will be understood, any suitable relays may be utilized.

Also it is to be understood that various other protective devices such as lightning arrestors, fuses, current limiting resistors, and the like, may be utilized wherever desirable without departing from the scope of the invention as defined by the appended claims.

The Zener diode 196 is connected in the line 192 in a blocking direction and consequently will conduct no current. When the voltage pulses reach the peak value, however, the diode will give reverse conduction and if there is sufficient current available to maintain the voltage above the breaking point, the voltage drop remains constant, consequently when the Zener diode 196 is connected in series with the coil 160 of the relay 158 there is no voltage across the coil until the break down voltage of the diode is exceeded. Thereafter, any increase in voltage appears across the coil of the relay and serves to energize the relay since the voltage drop across the diode does not increase. The resistor 194 is connected in series with diode 196 to prevent any damage to the diode by excessive voltage.

Consequently, it will be seen that a plurality of traffic control circuits (illustrated to be five in number), each effecting different traffic control functions may be actuated from the master controller over either a single wire or a pair of wires, as is desired, by utilizing the polarity and strength of the power pulses over these wires.

This is a highly advantageous feature since it permits the installation of traffic control systems which may be interconnected by existing wires which already interconnect the intersections and the necessity for installing a new multi-wire control cable for interconnecting the master and secondary controls is eliminated with the consequent elimination of the cost and traffic interruptions inherent in such multi-cable installations.

What I claim is:

1. In a traffic control system including a master supervisory controller and a plurality of secondary intersection controllers, the improvement comprising means for energizing a plurality of traffic control circuits in said secondary controllers from said master controller comprising a single function control wire interconnecting said master and secondary controllers, means in said master controller for transmitting over said single function control wire to said secondary controllers voltage pulses of full line value having a first polarity and negative voltage pulses of full line value and at least two selected voltage pulses of the opposite polarity, one of said selected pulses being of full line value and the other of said selected pulses being substantially less than full line value to effect more than two traffic control functions, means in each of said secondary controllers being responsive to said positive full line value voltage pulses and said negative full line value and less than full line value voltage pulses to selectively energize more than two of said traffic control circuits.

2. The traffic control system of claim 1, wherein said master and secondary controllers are interconnected by a second single function control wire and means are provided in said master controller for transmitting over said second wire positive and negative voltage pulses and means in each of said secondary controllers responsive to said pulses to actuate additional traffic control circuits.

3. A traffic control system comprising a master controller and a plurality of secondary controllers, not more than two function control wires interconnecting said master and secondary controllers, means in said master controller for selectively transmitting positive and negative voltage pulses of a first predetermined value over a first function control wire interconnecting said controllers, means for transmitting a voltage pulse of a second and different predetermined value over said first function control wire, means for selectively transmitting voltage pulses of opposite polarity over a second function control wire interconnecting said controllers, means in said secondary controllers responsive to said voltage pulses transmitted over said first function control wire to actuate first, second and third traffic control circuits, and further means in said secondary controllers responsive to said voltage pulses transmitted over said second function control wire to actuate fourth and fifth traffic control circuits.

References Cited in the file of this patent

UNITED STATES PATENTS

| | | |
|---|---|---|
| 2,796,595 | Schulenburg | June 18, 1957 |
| 2,834,001 | Wilcox | May 6, 1958 |
| 2,883,645 | Du Vivier | Apr. 21, 1959 |
| 2,932,003 | Barker | Apr. 5, 1960 |